United States Patent
Kalkbrenner et al.

(10) Patent No.: US 10,883,940 B2
(45) Date of Patent: Jan. 5, 2021

(54) FLUCTUATION-BASED FLUORESCENCE MICROSCOPY

(71) Applicant: Carl Zeiss Microscopy GmbH, Jena (DE)

(72) Inventors: Thomas Kalkbrenner, Jena (DE); Yauheni Novikau, Apolda (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 16/681,461

(22) Filed: Nov. 12, 2019

(65) Prior Publication Data
US 2020/0150044 A1   May 14, 2020

(30) Foreign Application Priority Data
Nov. 14, 2018   (DE) .................. 10 2018 128 590

(51) Int. Cl.
*G01N 21/64*   (2006.01)
*G02B 27/58*   (2006.01)
*G02B 21/00*   (2006.01)

(52) U.S. Cl.
CPC ..... *G01N 21/6458* (2013.01); *G02B 21/0076* (2013.01); *G02B 27/58* (2013.01)

(58) Field of Classification Search
CPC . G01N 21/6458; G02B 21/0076; G02B 27/58
See application file for complete search history.

(56) References Cited

U.S. PATENT DOCUMENTS

2009/0237501 A1   9/2009   Lemmer et al.
2010/0303386 A1   12/2010   Enderlein
(Continued)

FOREIGN PATENT DOCUMENTS

DE   21 2009 000 043 U1   2/2011
DE   10 2012 205 032 A1   10/2013
(Continued)

OTHER PUBLICATIONS

Baddeley, David, et al., "Three-Dimensional Sub-100 nm Super-Resolution Imaging of Biological Samples Using a Phase Ramp in the Objective Pupil," *Nano Res.*, vol. 4, No. 6, pp. 589-598 (2011).
Dertinger, Thomas, et al., "Achieving increased resolution and more pixels with Superresolution Optical Fluctuation Imaging (SOFI)," *Optics Express*, vol. 18, No. 18, pp. 18875-18885 (Aug. 30, 2010).
(Continued)

*Primary Examiner* — Dominic J Bologna
(74) *Attorney, Agent, or Firm* — Christensen, Fonder, Dardi & Herbert PLLC

(57) ABSTRACT

A fluctuation-based fluorescence microscopy method, comprising influencing a point-spread function of the imaging of a sample emitting fluorescence radiation using an optical device in dependence on a parameter such that a point emitter is imaged into a representation with two image lobes. The relative positions of the lobes depend on the position of the point emitter relative to the focal plane. Synthetic pixels, smaller than detector pixels, are generated; for each synthetic pixel, pairs of pixel groups are defined among pixels of the detector based on the influencing of the point spread function. Each pair is assigned to an individual value of the parameter. In each frame and for each synthetic pixel, a signal correlation is ascertained and allocated as image brightness to the synthetic pixel for the parameter specification. Subframes for each frame are produced from the synthetic pixels, and a high-resolution sample image is produced from the subframes.

11 Claims, 6 Drawing Sheets

(56) References Cited

U.S. PATENT DOCUMENTS

| | | | |
|---|---|---|---|
| 2013/0256563 A1 | 10/2013 | Kalkbrenner et al. | |
| 2013/0300833 A1 | 11/2013 | Soeller et al. | |
| 2015/0157210 A1* | 6/2015 | Zhang | A61B 5/0071 |
| | | | 600/473 |
| 2016/0085062 A1 | 3/2016 | Kalkbrenner | |
| 2016/0195704 A1 | 7/2016 | Kalkbrenner et al. | |
| 2017/0176337 A1 | 6/2017 | Kalkbrenner | |
| 2017/0307440 A1* | 10/2017 | Urban | G01N 33/57415 |
| 2018/0292634 A1* | 10/2018 | Ricco | G02B 21/0032 |

FOREIGN PATENT DOCUMENTS

| | | |
|---|---|---|
| DE | 10 2013 216 124 A1 | 2/2015 |
| DE | 10 2015 121 920 A1 | 6/2017 |
| DE | 10 2017 211 031 A1 | 5/2018 |
| WO | WO 2010/141608 A1 | 12/2010 |
| WO | WO 2012/039636 A2 | 3/2012 |
| WO | WO 2014/180680 A1 | 11/2014 |

OTHER PUBLICATIONS

Dertinger, T., et al., "Fast, background-free, 3D super-resolution optical fluctuation imaging (SOFI)," *PNAS*, vol. 106, No. 52, pp. 22287-22292 (Dec. 29, 2009).

Geissbuehler, Stefan, et al., "Comparison between SOFI and STORM," *Biomedical Optics Express*, vol. 2, No. 3, pp. 408-420 (Mar. 1, 2011).

Geissbuehler, Stefan, et al., "Live-cell multiplane three-dimensional super-resolution optical fluctuation imaging," *Nature Communications*, vol. 5, 7 pages (2014).

Juette, Manuel F., et al. "Three-dimensional sub-100 nm resolution fluorescence microscopy of thick samples," *Nature Methods*, vol. 5, No. 6, pp. 527-529 (Jun. 2008).

Juette, Manuel F., et al., "Three-dimensional sub-100 nm resolution fluorescence microscopy of thick samples," supplementary figures and text (11 pgs.), 2008.

Mikula, Grzegorz, et al., "Diffractive elements for imaging with extended depth of focus," *Optical Engineering*, vol. 44, No. 5, pp. 058001-1-058001-7 (May 2005).

Pavani, Sri Rama Prasanna, et al., "Three-dimensional, single-molecule fluorescence imaging beyond the diffraction limit by using a double-helix point spread function," *PNAS*, vol. 106, No. 9, pp. 2295-2999 (Mar. 3, 2009).

Quirin, Sean, et al., "Instantaneous three-dimensional sensing using spatial light modulator illumination with extended depth of field imaging," *Optics Express*, vol. 21, No. 13, pp. 16007-16021 (Jul. 1, 2013).

Reymann, Jürgen, et al., "High-precision structural analysis of subnuclear complexes in fixed and live cells via spatially modulated illumination (SMI) microscopy," *Chromosome Research*, vol. 16, pp. 367-382 (2008).

Zahreddine, Ramzi N., et al., "Binary phase modulated partitioned pupils for extended depth of field imaging," *Imaging and Applied Optics*, (Optical Society of America), 3 pages (2015).

\* cited by examiner

FLUCTUATION-BASED FLUORESCENCE MICROSCOPY

PRIORITY CLAIM

The present application claims priority to German Patent Application No. 10 2018 128 590.6, filed on Nov. 14, 2018, which said application is incorporated by reference in its entirety herein.

BACKGROUND OF THE INVENTION

The invention relates to a microscopy method for producing a high-resolution image of a fluorescent sample using fluctuation-based fluorescence microscopy.

The examination of samples using microscopy is a broad technical field for which there are various technical solutions. Proceeding from conventional light microscopy, a wide variety of microscopy methods have been developed.

One conventional area of application of light microscopy for examining biological preparations is fluorescence microscopy. Here, specific dyes (so-called fluorophores) are used to specifically label samples, e.g. cell parts. The sample is illuminated with excitation radiation, and the fluorescence radiation that has been excited thereby is captured. It is also possible to measure samples that luminesce per se, i.e. without the addition of a labeling substance.

For resolutions beyond the diffraction limit, which is dictated by the laws of physics, various approaches have recently been developed. Those microscopy methods are characterized in that they provide the user with a higher lateral optical resolution than conventional microscopes. In this description, such microscopy methods are referred to as high-resolution microscopy methods because they achieve a resolution beyond the optical diffraction limit. Diffraction-limited microscopes, on the other hand, are referred to as traditional microscopes.

The publications T. Dertinger et al., "Fast, background-free, 3D super-resolution optical fluctuation imaging (SOFI)," PNAS (2009), pp. 22287-22292; T. Dertinger et al., "Achieving increased resolution and more pixels with Superresolution Optical Fluctuation Imaging (SOFI)," Opt. Express, 30 Aug. 2010, 18(18): 18875-85, doi: 10.1364/IE.18.018875 and S. Geissbuehler et al., "Comparison between SOFI and STORM," Biomed. Opt. Express 2, 408-420 (2011) disclose a high-resolution method of fluctuation-based widefield fluorescence microscopy. This method utilizes the blinking properties of a fluorophore. If the fluorophores of a sample blink statistically independently of one another, a significant resolution increase beyond the physically specified optical resolution limit can be achieved by imaging the sample by way of suitable filtering with what is known as a cumulant function. To produce a high-resolution image, a sample is excited and imaged in widefield. A sequence of frames is recorded in the process and then combined with the cumulant function to form a frame which then has said higher resolution. This method is referred to as fluctuation-based fluorescence microscopy. Some authors have coined the term SOFI for fluctuation-based fluorescence microscopy, an abbreviation of the term "super-resolution optical fluctuation imaging." However, individual researchers have recently also established different abbreviations for fluctuation-based fluorescence microscopy.

In detail, the following steps are performed in these generic fluctuation-based fluorescence microscopy methods: The sample is provided with, or contains, a substance which emits fluorescence radiation in a blinking manner after excitation. A blinking frequency is here distributed, preferably statistically, over a frequency range. What is important is that different blinking states occur in the sample. By irradiation with illumination radiation, the sample is excited to emit the fluorescence radiation in a blinking manner. The sample is imaged onto a spatially resolving detector, with the result that an image sequence of frames that differ in terms of the blinking state of the sample is obtained. The image sequence is evaluated and a high-resolution sample image, that is to say an image having a spatial resolution that is increased beyond the optical resolution of the imaging, is produced.

For fluctuation-based fluorescence microscopy, an image sequence with the widest possible variety of blinking states of the fluorophores that have been added to the sample or are inherently present in the sample is required. At the same time, the camera must be able to temporally capture said blinking while providing a high spatial resolution. In the realization, it is necessary to ensure that as few fluorophores as possible change their fluorescence state during the recording of a frame and that the fluctuations of individual fluorophores (that is to say the change in fluorescence state) are detectable from one frame to the other. The method is therefore suitable for thin samples which have virtually no depth extent along the optical axis of the imaging with respect to the fluorescent material.

The situation is different in what is known as localization microscopy, in which it is ensured that, if possible, only molecules that are situated at a distance from the adjacent emitting molecule such that the molecules can be distinguished within the extent of the optical resolution of the microscope emit fluorescence radiation in the sample. The fluorescent molecules are thus isolated within the meaning of optical distinguishability. For microscopy methods of which the PALM method, as it is called, is a known representative, it has been proposed to manipulate the point spread function of the imaging in a manner such that it becomes asymmetric, wherein the asymmetry changes depending on depth, that is to say with the distance from the focal plane of the imaging optical unit. One example of this is splitting a point image into two image lobes whose relative position is dependent on the depth position of the emitting molecule. The point spread function of such imaging fundamentally differs from the typical three-dimensional Gaussian shape of diffraction-limited imaging. It is possible to obtain a depth indication for each isolated molecule from the current relative position of a point image that is distorted in that way. In localization microscopy, such influencing of the imaging is acceptable because, due to the isolation of the individual molecules, there is no danger of confusion with the point image of a different molecule, or such confusion can be tolerated, or the corresponding image portions can be discarded. The same situation arises when a sample is to be analyzed with respect to the wavelength range, that is to say the color of the emitted fluorescence radiation. It is known practice in this respect, too, to manipulate the point spread function of the imaging in a manner such that it is asymmetrically dependent on a parameter which in this case, by contrast, is then the wavelength of the emitted fluorescence radiation.

However, fluctuation-based fluorescence microscopy operates not with optically separated, that is to say isolated, emitters but rather with time series of frames of which each represents a fluorescent image of the entire sample structure. The influencing of the point spread function, which is suitable in localization microscopy, would therefore result in a completely distorted imaged representation of the sample for each frame and would therefore be entirely unusable for fluctuation-based fluorescence microscopy.

A different approach for obtaining spectral and/or depth information is realized in conventional confocal microscopy by recording a plurality of images that differ with respect to a parameter, specifically either the depth position of the focal plane or the wavelength. In the case of the depth information, an image stack is thus obtained. The image stack consists of a sequence of different depth images that were each obtained with an individual setting of the focal plane. This increases the time requirement—specifically linearly with the number of depth planes. In the case of the plurality of frames that are obtained in different spectral channels, it needs to be ensured that the spectrally different frames are combined in a highly precise manner. This requires mutual adjustment of the spectral channels with subpixel accuracy. At the same time, a plurality of cameras are regularly required which analyze spectrally differently filtered channels. This increases the outlay in terms of apparatus. Since fluctuation-based fluorescence microscopy already requires a multiplicity of frames and very fast and consequently complex cameras to obtain the image sequence, these approaches would result in an intolerable prolongation of the image recording and/or in a significant increase in the outlay.

SUMMARY OF THE INVENTION

The invention is therefore based on the object of specifying a high-resolution fluctuation-based fluorescence microscopy method with which samples can be imaged not only with a high lateral resolution but additionally in a manner resolved with respect to at least one parameter, specifically depth position of the emitters and/or spectral range of the emitted fluorescence radiation.

In the microscopy method, in accordance with the already described generic fluctuation-based fluorescence microscopy for producing a high-resolution image of a sample, the sample is either provided with a substance which, after excitation, emits fluorescence radiation in a statistically blinking manner, or a sample that already contains such a substance is used. This represents a step a) of the method.

Next, in a step b), illumination radiation is used to irradiate the sample, and the sample is thereby excited for blinking emission of the fluorescence radiation.

In a step c), the blinking sample is imaged. This is done from a focal plane into an image plane in which a detector that is spatially resolving and comprises pixels is located. In this way, an image sequence of frames that differ in terms of a blinking state of the sample is obtained. The imaging of the sample emitting the fluorescence radiation is optically influenced in dependence on at least one parameter. The parameter is a position relative to the focal plane and/or a wavelength of the emitted fluorescence radiation. The influencing results in point emitters in each frame being imaged into imaged point emitter representations that each have at least two image lobes whose relative position depends on the parameter. In embodiments, a point spread function of the imaging process is to this end influenced using an optical manipulation device. The influencing depends on the parameter and is accomplished in a manner such that each point emitter in the image plane no longer has the typical, approximately Gaussian imaged point emitter representation. Rather, the imaged point emitter representation is such that it is rotation-asymmetrical and comprises at least two image lobes. The relative position of the image lobes of the imaged point emitter representation depends on the parameter, that is to say on the position of the respective point emitter with respect to the local plane and/or on the wavelength of the fluorescence radiation emitted by the respective point emitter.

In a step d), subframes are produced for each frame on the basis of the influencing that is dependent on the parameter and are specified with respect to the parameter. The optical influencing of the imaged representation (i.e. the point spread function) that was performed in step c) is corrected such that the subframes are no longer optically influenced. The frames which are not usable per se owing to the influencing of the imaged representation, because they are distorted, are divided into undistorted subframes according to the parameter. The image sequence is evaluated based on the subframes, which do not have to be output separately but can by all means be present merely as virtual images in a phase of the data processing, to produce a sample image that not only has a high lateral resolution but is also specified in a further dimension defined by the parameter. If the parameter comprises the position in relation to the focal plane, a z-stack of sample images having a high lateral resolution is produced. If the parameter comprises the wavelength, coloring of the sample image having a high lateral resolution or (if combined with depth resolution) of the sample images having a high lateral resolution can be produced.

In this way, the sample image is highly resolved (laterally) in two spatial dimensions and also resolved in at least one further dimension, that is to say it receives at least one further dimension owing to a depth resolution and/or spectral resolution. In this way, the fluctuation-based 2D fluorescence microscopy is extended by at least one further dimension (depth and/or color), and fluctuation-based 3D or even 4D fluorescence microscopy is realized. If the parameter is depth information, a resolution that is increased beyond the recording of 2D image stacks in the z-direction is even achieved. This is due to the fact that the optical influencing of the imaged representation, that is to say the manipulation of the point spread function, permits a higher resolution in the depth direction than the use of the conventional, approximately Gaussian point spread function together with 2D image stacks in the z-direction.

"High resolution" is here understood to mean, as is convention in microscopy, that the optical resolution of the high resolution sample image is better than the spatial resolution that imaging of the sample emitting the fluorescence radiation permits.

In step d), five partial steps are performed in embodiments:

1. A plurality of discrete values are defined for the parameter. These are, for example, z-planes or centroid wavelengths. Synthetic pixels that are smaller and situated more densely than the pixels of the detector are generated for all frames. The term "synthetic pixel" is intended to express that this is a pixel that is smaller than is actually permissible owing to the spatial resolution of the widefield microscope.

2. For each synthetic pixel, a plurality of n-tuples of pixel groups or individual pixels are defined among the pixels of the detector. n designates the number of image lobes; if there are two image lobes, the n-tuple is a pair. Pixel groups or individual pixels of the n-tuples and thus the n-tuples are defined based on the influencing, which is dependent on the parameter, in a manner such that each of the n-tuples is assigned an individual one of the discrete values of the parameter. This is simply possible because the influencing that is dependent on the parameter is known and it is consequently also known on which two (in the case of n=2) surface regions of the detector the two image lobes will be located for a specific one of the discrete values of the parameter. These surface regions correspond to pixels that are consequently combined to form a pair of pixel groups or of individual pixels that is assigned to the specific one of the discrete values of the parameter. The two (in the case of n=2) pixel groups or individual pixels are thus situated where the centroid of the image lobes is located for the assigned, synthetic pixel at the respective value of the parameter. This analogously applies to n=3 or higher (n-tuple instead of pair). To describe the influencing that is dependent on the parameter, a point spread function of the imaging can be used.

3. Each of the synthetic pixels is divided into a plurality of subpixels, wherein each subpixel is assigned one of the discrete values of the parameter. The synthetic pixels represent intermediate pixels with reference to the pixel distribution in the frames.

4. For each synthetic pixel, brightnesses of the subpixels are ascertained in each frame on the basis of signal correlation values of the n-tuples which were defined for the synthetic pixel. It is here possible in embodiments to perform a subpixel allocation operation to ascertain the brightnesses of the subpixels for each synthetic pixel. In the subpixel allocation operation, a signal correlation value is ascertained for each of the defined n-tuples and allocated to the subpixel of the synthetic pixel that is assigned to the n-tuple. Embodiments use a cross-correlation or cumulant function to ascertain the signal correlation values.

5. The subframes for each frame are produced based on the synthetic pixels, which have been divided into subpixels.

In a preferred development, the pairs of pixel groups or of individual pixels are situated symmetrically with respect to a center that is the lateral coordinate of the assigned synthetic pixel. In most embodiments, the center corresponds to the point at which a point emitter image would be located without optical influencing. Consequently, it is the point at which a sample point would be imaged if the point spread function were rotation-symmetrical and not changed asymmetrically in dependence on the parameter.

The image evaluation is particularly simple if what is known as the self-similarity of the point spread function is low. It has been shown that this condition has been met if the image lobes, which each have an image lobe extent and an image lobe center, are spaced apart such that the distance between the image lobe centers is greater than the image lobe extent. Particularly preferred is a factor of at least two, that is to say that the distance between the image lobe centers is at least twice as great as the image lobe extent.

The manipulation device for influencing in dependence on the parameter can with particular preference comprise a phase element, an anisotropic optical unit, a spatial light modulator, an axicon, a cubic phase mask and/or a ring phase mask (that is to say including combinations thereof).

The embodiments of the invention combine the advantages of fluctuation-based fluorescence microscopy with methods for depth-resolved and/or spectrally resolved microscopy, which have so far been assumed to be incompatible with the principles of fluctuation-based fluorescence microscopy. Owing to a comparatively simple change of the beam path of conventional fluctuation-based widefield fluorescence microscopy, the two-dimensional high resolution of fluctuation-based fluorescence microscopy is, in combination with the particular evaluation of the frames, extended by at least one further dimension, specifically the depth information and/or the spectral information. In this way, the obtained image information is increased and it is possible to perform additional sample evaluations.

BRIEF DESCRIPTION OF THE DRAWINGS

The invention will be explained in more detail below on the basis of exemplary embodiments, with reference being made to the attached drawings, which likewise disclose features essential to the invention. These exemplary embodiments serve merely for elucidation and should not be interpreted as restrictive. By way of example, a description of an exemplary embodiment with a multiplicity of elements or components should not be interpreted to the effect that all these elements or components are necessary for implementation purposes. Rather, other exemplary embodiments also may contain alternative elements and components, fewer elements or components or additional elements or components. Elements or components of different exemplary embodiments can be combined with one another, unless indicated otherwise. Modifications and variations which are described for one of the exemplary embodiments may also be applicable to other exemplary embodiments. In order to avoid repetition, the same elements or corresponding elements in different figures are denoted by the same reference signs and are not explained a number of times. In the figures.

DETAILED DESCRIPTION

Figure 1:
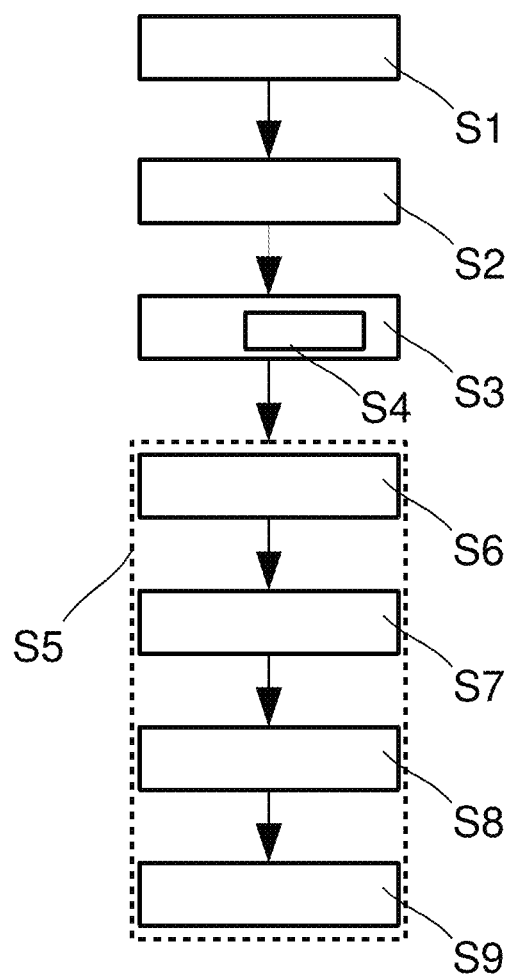
FIG. 1 shows a block diagram of an embodiment of a microscopy method for producing an image that also has high resolution in the depth direction.

FIG. 1 shows a block diagram of an embodiment of a microscopy method for producing an image that is also resolved in the depth direction and/or spectrally by way of fluctuation-based fluorescence microscopy.

In a step S1, a sample is provided with a label, which is the substance mentioned in the introductory part, which, after excitation, emits specific fluorescence radiation in a statistically blinking manner. Alternatively, a sample that already contains the substance is chosen.

In a subsequent step S2, illumination radiation is used to irradiate the sample, and in this way the emission of the specific fluorescence radiation by the substance in the sample is excited.

Subsequently, in a step S3, the sample is repeatedly imaged, and an image sequence of frames that show different blinking states of the sample is produced. Owing to the blinking behavior, each frame involves a different blinking state of the sample. During imaging, a point spread function (PSF below) of the imaging optical unit is changed such that an imaged diffraction representation of a point emitter is not, as usual, Gaussian but rather is asymmetrically changed. The change here is dependent on a parameter, specifically the depth position of the emitter and/or the spectral channel in which the emitter emits. The depth position here is understood to mean the position relative to a focal plane of the imaging beam path. Where the depth position is mentioned below as a parameter, this is purely by way of example and only selected thus for illustrative purposes.

The asymmetrical shape of the imaged point emitter representation is such that the imaged point emitter representation has two image lobes, the relative position of which is dependent on the value of the parameter, that is to say for example on the current depth position of the emitting molecule. This applies to all point emitters that contribute to a frame. This optical influencing is performed during step S3, since it acts during the imaging, for example by way of a corresponding manipulation element being arranged in the imaging beam path in a microscope, which will be explained below by way of example with reference to FIG. 2.

Subsequently, in a step S5, a high-resolution sample image, which is additionally resolved in terms of depth and/or spectral channel, that is to say according to the at least one parameter, is produced from the image sequence of the frames according to the principle of fluctuation-based fluorescence microscopy. In embodiments, this step is realized by sub-steps S6 to S9. However, division into sub-steps is optional, and it is likewise possible to combine the sub-steps in desirable combinations or to combine all of them.

In sub-step S6, a structure of synthetic pixels in a greater density is calculated for the frames. In addition, the number of the depth planes (typically z-planes) is defined. The number of depth planes defines the distance between the depth planes, that is to say the z-positions. For example, if the region in which the z-coded PSF permits assignment to the depth planes is 1.8 µm, which is an achievable value in objectives having a large NA, and if 15 depth planes are defined, this gives a plane spacing of 120 nm. This will then also automatically be the depth resolution of the subsequent image. A similar situation applies to spectral resolution. Each synthetic pixel is divided into subpixels in accordance with the number of depth planes. As a result, each subpixel is assigned to an individual, discrete value of the parameter.

In sub-step S7, pairs of pixel groups or individual pixels are defined for each synthetic pixel on the basis of the modified PSF. Owing to the modified PSF, each pair has maximum image intensity at the value of the parameter it is assigned if an emitter were located at the site of the synthetic pixel. The definition can be effected either manually, by defining for each depth plane which individual pixel pair or pixel group pair in the PSF will have maxima in the image intensity, or automatically using a measured point spread function, for example by threshold formation. Pairs are present when the optical influencing results in asymmetry with two image lobes. In the case of more image lobes, generally n-tuples rather than pairs are present. For the sake of simplicity, pairs will be mentioned in the following text.

After these preparations in sub-steps S6 and S7, which need to be performed only once and can also occur, as preparation, before step S5 as desired, a cross-correlation (products of the pixel intensities) for the defined pairs of pixel groups or individual pixels is formed in sub-step S8 for each depth plane and in each depth plane for each synthetic pixel of the oversampled image that was produced by the definition of the synthetic pixels. For each subpixel in the associated frame of the image sequence, the products of the signal intensities of the individual pixels or pixel groups of a pixel pair are calculated. This is performed for all defined pixel pairs.

The subpixel obtains its brightness from the correlation value, that is to say typically the product of the pixel intensities.

Subframes are produced from the subpixels, wherein each subframe is composed from the subpixels of an individual value of the parameter, that is to say is assigned to exactly one value of the parameter. In this way, a plurality of subframes that can each be interpreted to be a separate image sequence are produced in sub-step S8 from each frame.

The subframes are then, in sub-step S9, subjected to the conventional evaluation for fluctuation-based fluorescence microscopy. The evaluation in known embodiments uses what is known as a cumulant function. There are two fundamentally different approaches for the evaluation. First, all subframes can be combined into sub-image sequences in accordance with the individual value of the parameter. A sub-image sequence thus has an individual and constant value of the parameter, for example an individual depth position or an individual wavelength specification, or a combination thereof. Next, each sub-image sequence can be subjected to the conventional evaluation for fluctuation-based fluorescence microscopy. As an alternative to this, the subframes are recombined into frames, wherein each synthetic pixel is assigned not only a lateral coordinate but also at least one coordinate of a further dimension, specifically the depth information or the spectral information. The result is then only a single image sequence of frames having higher-dimensional pixels. However, of these higher pixel dimensions, only the lateral information would need to be taken into account in the evaluation. This approach is more economical in terms of computation outlay, but has the disadvantage that only a single depth and/or spectral value can generally be assigned to a synthetic pixel. Pixels that are luminous over a plurality of depth values and/or spectral values could in this way be captured only if the information of an individual synthetic pixel is supplemented by, in addition to the x- and y-coordinates, as many coordinates as there are different, discrete values of the parameter. In addition to the value of the x- and y-coordinates, the information of a pixel then also consists for example of the image brightness of a first z-plane, the image brightness of a second z-plane, the image brightness of a third z-plane and the image brightness of a fourth z-plane (in the case of four discrete values for the depth information). Pixel coordinates which have been supplemented in this way can then be combined into a single frame, with the result that there is only one image sequence that needs to be evaluated.

In principle, this extends fluctuation-based fluorescence microscopy, which is generally two-dimensional, by at least one further dimension, specifically the depth dimension and/or the spectral dimension. As a result, the invention realizes fluctuation-based 3D or even 4D fluorescence microscopy.

Figure 2:
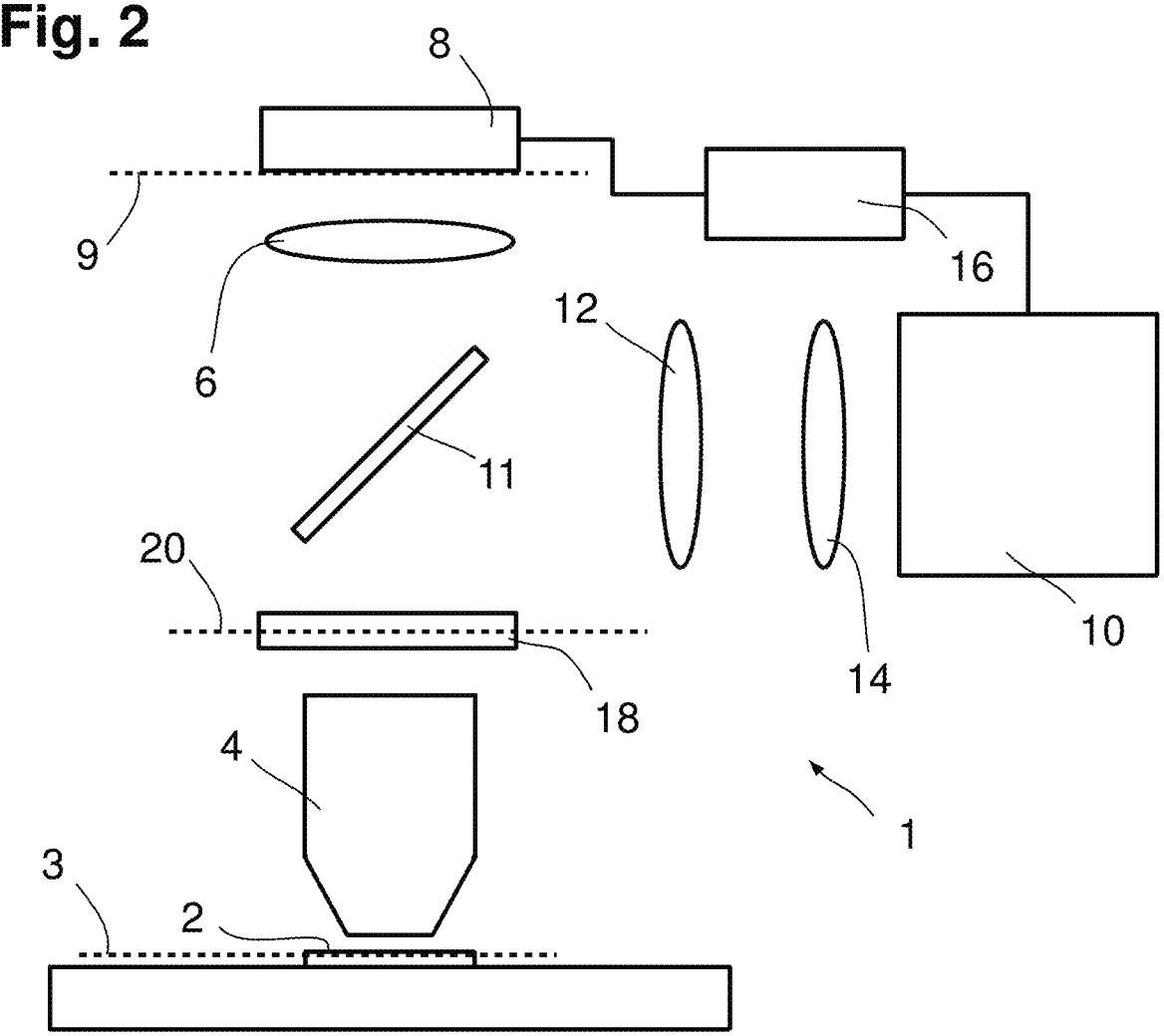
FIG. 2 shows a schematic illustration of a microscope for high-resolution 3D fluctuation-based fluorescence microscopy.

FIG. 2 shows a microscope 1, which can be used for performing the method of FIG. 1. A sample 2 is imaged with the microscope 1 via an objective 4 and a tube lens 6 onto a detector 8. A focal plane 3 is located in the sample, and the detector 8 is located in an image plane 9. To this extent, this corresponds to a known widefield microscope arrangement. A beam splitter 11, via which an illumination beam path is input, which introduces radiation from an illumination source 10 into the sample 2 via beam-shaping devices 12, 14, is located in the beam path of the imaging.

The microscope of FIG. 2 is controlled by a control device 16 that is connected to the corresponding elements via control lines, which are not designated in more detail. It is important for the embodiments that the control device 16 reads the detector 8.

A manipulation device 18 is furthermore provided in the microscope, which manipulation device 18 in the described embodiment is located in a pupil plane 20 of the imaging beam path, which extends from the sample 2 via the microscope 4 and the tube lens 6 to the detector 8. The manipulation device is formed for example as a phase plate, as is used for depth-resolving localization microscopy in WO 2014/18068. Reference is explicitly made in this respect to that publication. The phase element ensures that a point emitter, located in the sample 2, is imaged in the image plane not into a point-shaped image, but rather into a diffraction image having two image lobes. Thus, by way of example, n=2.

Figure 3:
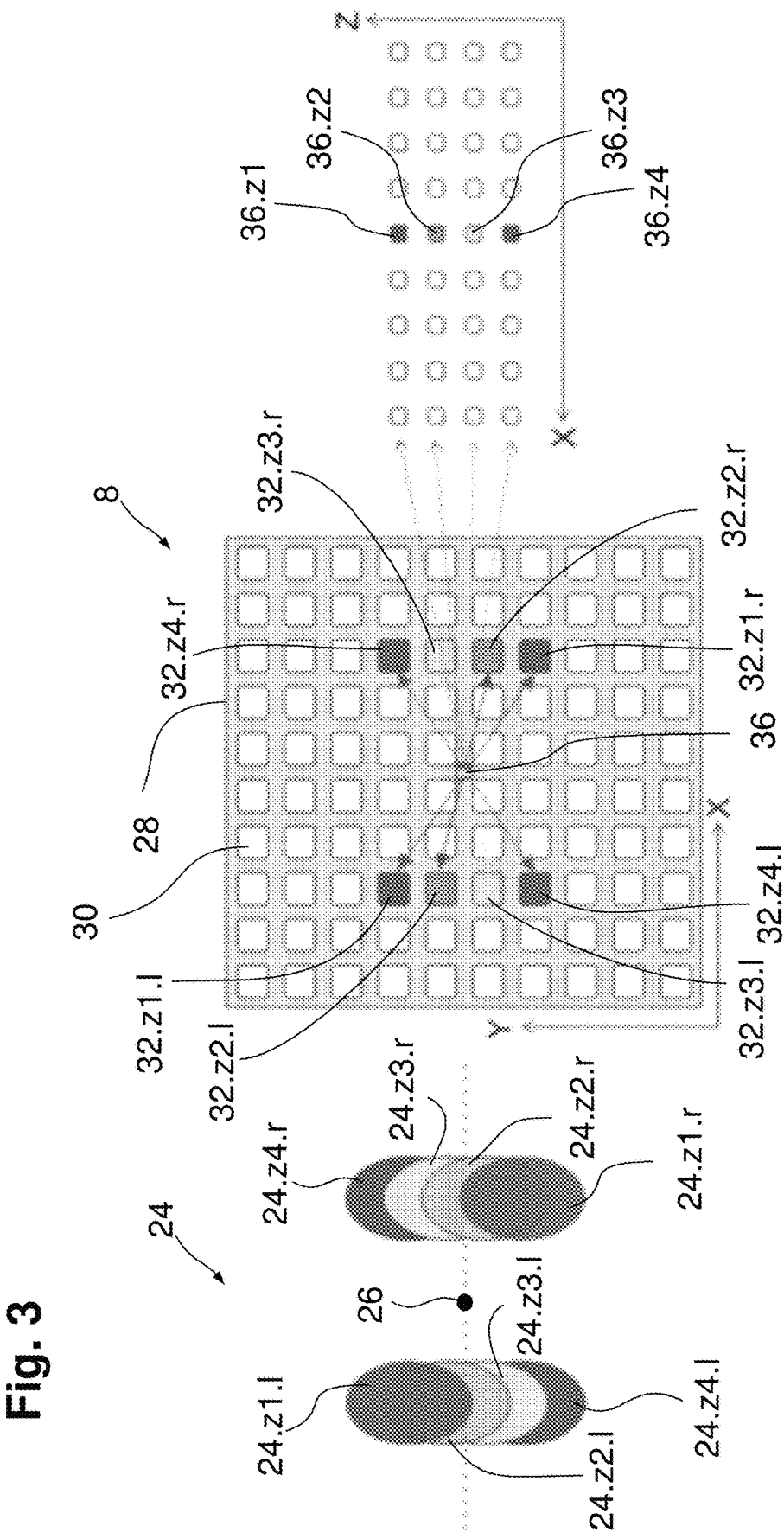
FIGS. 3 to 6 show different schematic illustrations for explaining a manipulation of the point spread function in the microscope of FIG. 1 and the evaluation-based use of said manipulation to obtain information in a further dimension.

This diffraction image 24 having two image lobes is shown in the left part of FIG. 3. The center 26 here designates the point at which the point emitter image would be produced without the manipulation device 18. However, owing to the phase plate, the diffraction image 24 has two image lobes. Their relative position is dependent on the location of the corresponding emitter relative to the focal plane 3. FIG. 3, which shows the diffraction image 24 in plan view onto the image plane 9, presents different possible depth positions of the point emitter, specifically depth positions z1 to z4. The three-part reference signs in FIG. 3 designate the depth plane between the points and, by means of the last element, whether it is the left image lobe or the right image lobe.

For a first depth plane z1, a right image lobe 24.z1.r, which is located on the right-hand side of the center 26, is assigned to the left image lobe 24.z1.1. An emitter that is located somewhat closer to the focal plane in a second depth plane z2 produces the image lobes 24.z2.1 and 24.z2.r. A point emitter that is located even further up in a third depth plane z3 and is thus arranged above the focal plane 3 would produce the image lobes 24.z3.1 and 24.z3.r. By contrast, a point emitter that is located symmetrically, with reference to the focal plane 3, on the other side from position z1 and in a fourth depth plane z4 produces a diffraction image 24 consisting of the image lobes 24.z4.1 and 24.z4.r.

Even though the left part of FIG. 3 shows the diffraction image 24 for four different depth positions z1, z2, z3 and z4, the actual diffraction image 24 for a fluorescence emitter is of course present for only one depth position, that is to say it consists of exactly one pair of two image lobes 24.x.1 and 24.x.r, with "x" designating the respective depth plane. The pair is symmetric with respect to the center 26.

Figure 4:
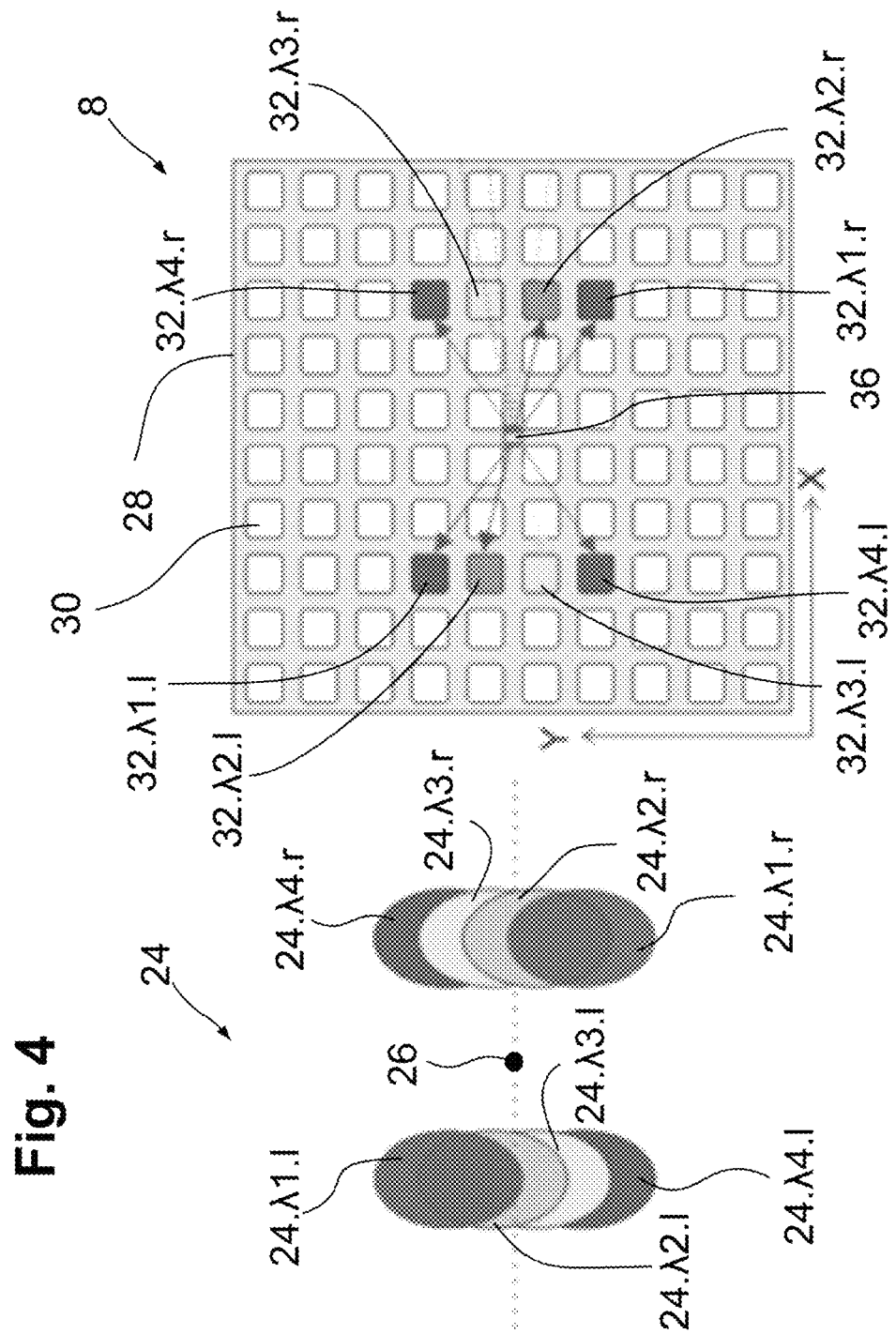

This effect of producing the diffraction image 24 in FIG. 3 is dependent only on the depth plane. This is due to the realization of the manipulation element 18 in this embodiment. FIG. 4 shows the case for four different spectral channels λ1, λ2, λ3 and λ4. The conditions are otherwise identical.

The central portion of FIGS. 3 and 4 shows how the diffraction image 24 is located on the detector surface 28 of the detector 8, but is shown in concrete terms only for one hypothetical point emitter at the lateral site of a single synthetic pixel 36. The detector surface 28 of the detector has pixels 30. In the case of a point emitter that is located at the depth position z1, the radiation centroid is incident on the pixels 32.z1.1 and 32.z1.r. If the point emitter is located in the depth plane z2, the pixels 32.z2.1 and 32.z2.r are illuminated. In the case of an emitter in the depth plane z3, the sample light is incident on the pixels 32.z3.1 and 32.z3.r. If, by contrast, the point emitter is located in the depth plane z4, the pixels 32.z4.1 and 32.z4.r emit a high electrical signal since they are subject to intense illumination. All pixels are located symmetrically with respect to the synthetic pixel 36, which represents the lateral position in x/y-coordinates on the detector surface 28 for the pairs of pixels. This corresponds to the center 26. This distribution shows that, in sub-step S6, pairs of individual pixels 32.x.1 and 32.x.r can be defined for each synthetic pixel 36, wherein each pair is assigned to a different value of the parameter (in the present case the depth position).

In contrast to localization microscopy, it is not one isolated fluorescence emitter that emits light in fluctuation-based fluorescence microscopy, but rather the blinking states of the sample contain a large number of non-isolated luminous fluorescence emitters. For this reason, provision is made for the frames, which are composed of the pixels 30, to be appropriately processed. To this end, each synthetic pixel 36 is divided into subpixels 36.z1, 36.z2, 36.z3 and 36.z4, wherein each subpixel is assigned to an individual and discrete value of the parameter—in the present case the depth position. This is done by way of example in sub-step S8 by means of a cross-correlation of the two parts of each pixel pair. The correlation amplitude is calculated for each pair and assigned as a brightness value to the subpixel that is located in the depth plane that is assigned to the pair. Said subpixel is shown in the right-hand illustration of FIG. 3 in accordance with its z-coordinate thus ascertained. The subpixels of each synthetic pixel are allocated the brightness in accordance with the cross-correlation. The cross-correlation of the pixel pair 32.z1.1, 32.z1.r indicates the brightness for the subpixel 32.z1 when the corresponding emitter is located in the z1 plane. The brightness for the subpixel 36.z2 is obtained in the case of the pixel pair 32.z2.1 and 32.z2.r. This applies analogously to the pixel pair 32.z3.1 and 32.z3.r and the subpixel 36.z3 and also to the pixel pair 32.z4.1 and 32.z4.r and the subpixel 36.z4. This situation occurs of course only if for a synthetic pixel only one of its subpixels is relevant, that is to say the corresponding emitter is located only in this one depth plane. However, in reality, there are also cases in which emitters extend over a plurality of depth planes. For this reason, a procedure that proceeds from the depth planes (generally the discrete parameter values), that is to say basically from the for example subpixels, and calculates and adds up for each parameter value, i.e. subpixel, the cross-correlation for the individual pairs is preferred. If an emitter is located in only one depth plane, only one pair, specifically the one for the corresponding depth plane, will contribute to said sum, and the other pairs are not correlated. If, by contrast, an emitter extends over a plurality of z-planes, then a plurality of pairs contribute to the sum, which is then certainly intentional. This procedure is performed for all subpixels, that is to say for all discrete values of the parameter which are provided for the synthetic pixel—and then of course also for all synthetic pixels. In this way, the correlation pattern is formed over all synthetic pixels.

At the end of step S8, a group of subframes is available for each frame, wherein each of the subframes is assigned to exactly one individual one of the discrete values of the parameter, that is to say one depth position, one wavelength range or one specific combination of depth position and wavelength range. An image sequence of for example f frames thus becomes an image sequence of f*g frames, wherein g is the number of different discrete values of the parameter. In sub-step S9, this quantity of frames is then subjected (see above) to the evaluation for fluctuation-based fluorescence microscopy.

FIG. 3 merely shows a simplification with respect to the possible depth planes. In embodiments, more than four possible pixel pairs are used to distinguish between more than four discrete parameter values (e.g. depth planes).

As already mentioned, FIG. 4 shows the alternative in which the diffraction image 4 codes not the z-coordinate, i.e. the depth, but rather a spectral channel. Otherwise, what was said above applies analogously, although the allocated beam parameter specification is in that case of course not the depth indication, but rather the spectral channel. For this reason, as compared to FIG. 3, the right-hand depiction, which in FIG. 3 referred to the depth coordinate, has also been dispensed with in FIG. 4.

Figure 5:
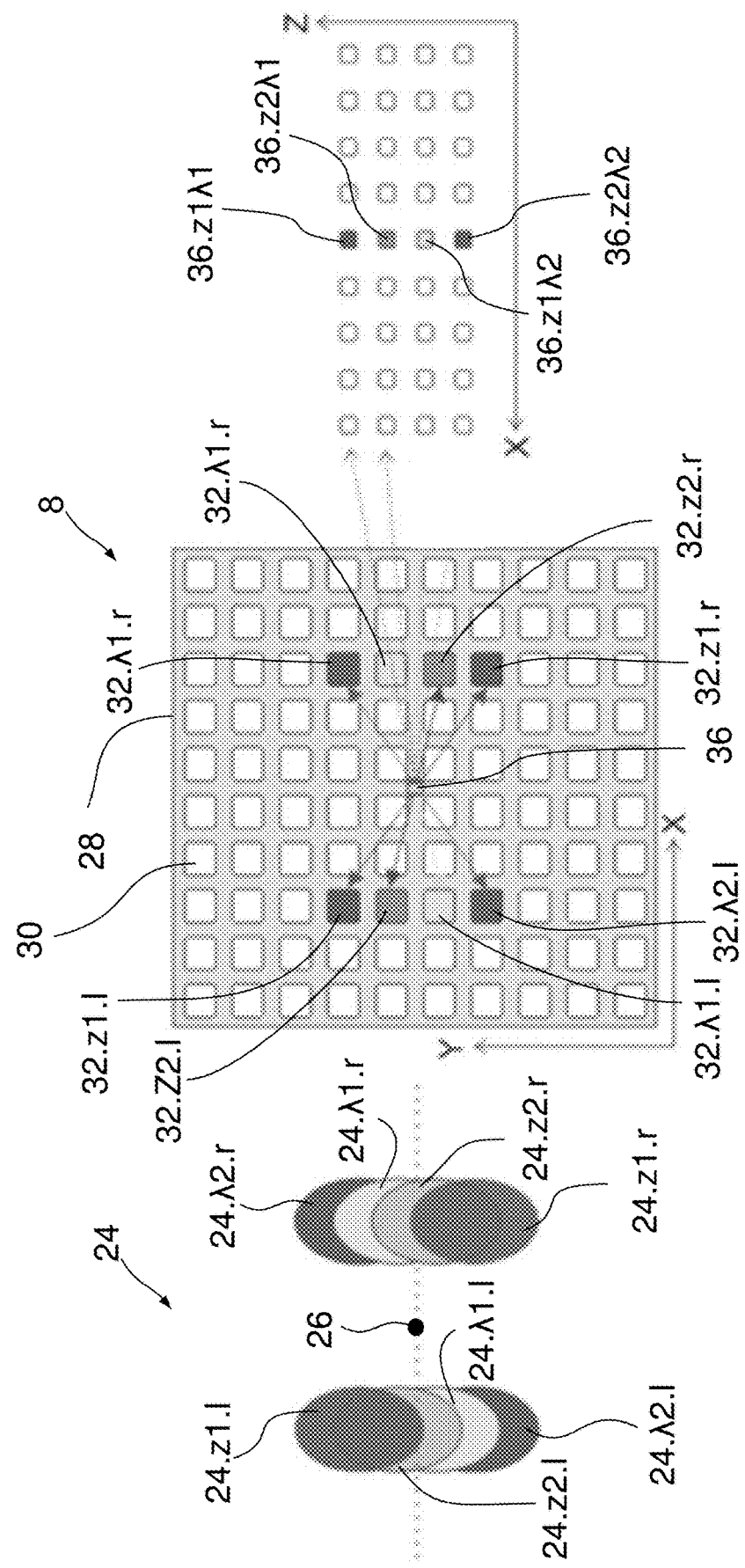

A combination is likewise possible, as shown in FIG. 5. Here, with a corresponding design of the manipulation element, which can certainly also be formed from a plurality of parts, the diffraction image 24 is coded both with respect to two depth planes z1 and z2 and with respect to two spectral channels λ1 and λ2. Otherwise, the reference signs correspond to those in FIG. 3. For each depth indication, a spectral indication is additionally obtained, which means that the synthetic pixels 36.z1 and 36.z2 in FIG. 5 are additionally provided with a spectral indication, specifically spectral channel λ1 or spectral channel λ2. This consequently results in the combinations z1z1, z1z2, z2z1, z2z2. This is not shown in FIG. 5.

Figure 6:
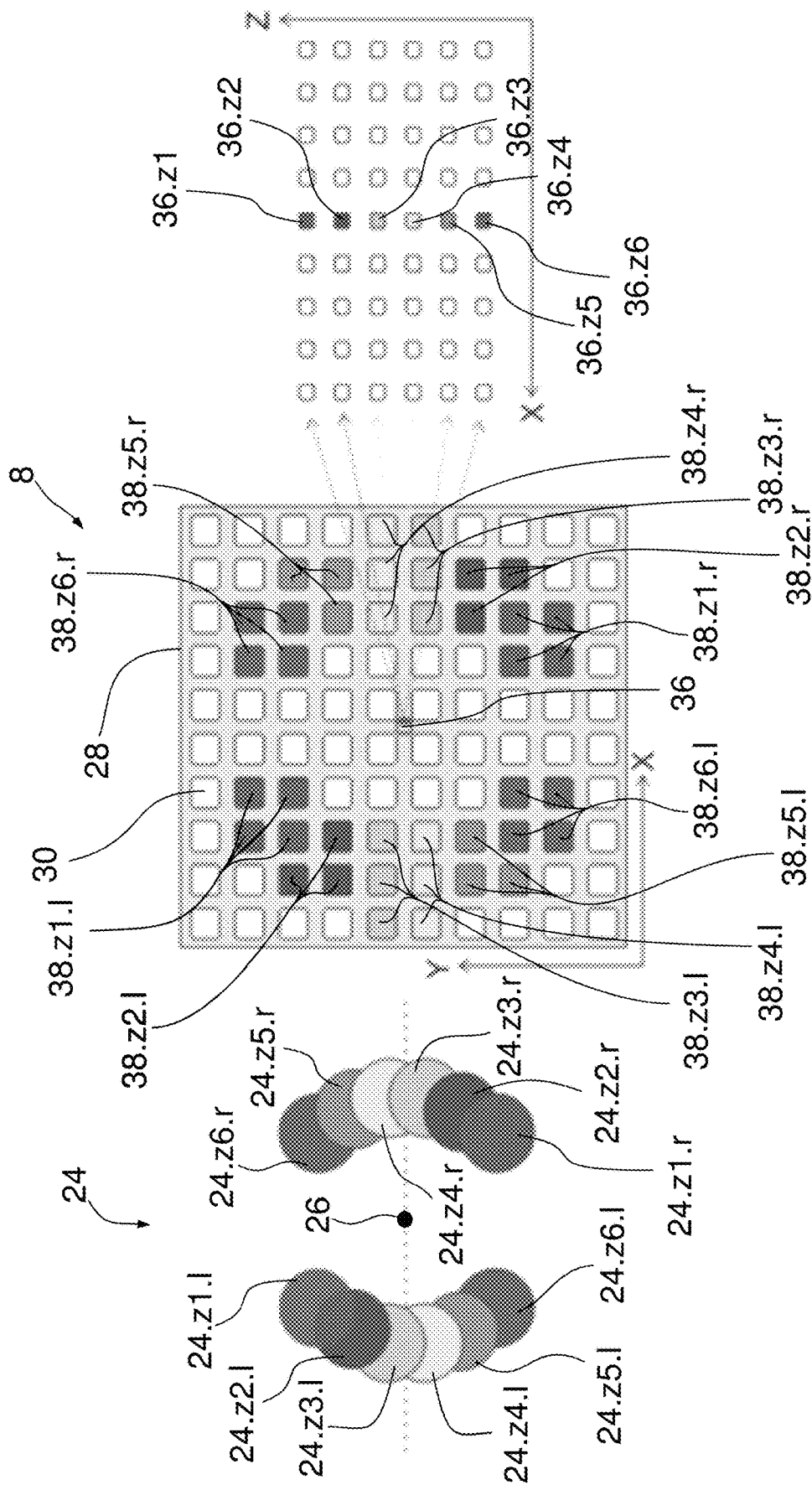

FIG. 6 shows a development in which the diffraction image 24 is distinguished with respect to a greater number of pairs. In addition, the diffraction image is marked in that, with variation of the parameter, in the present case purely by way of example only the depth coordinate z, it is displaced not along a straight line but rather along an arc. A corresponding manipulation element therefor is known from the publication S. Parvani et al., "Three-dimensional, single-molecule fluorescence imaging beyond the diffraction limit by using a double-helix point spread function," Proceedings of the National Academy of Science, 106.9, 1009, pp. 2995-2999, or from the publication D. Baddeley et al., "Three-dimensional sub-100-nm super-resolution imaging of biological samples using a phase ramp in the objective pupil," Nano Research, 4.1, 2011, pp. 589-598 or from WO 2012/039636 A2. FIG. 6 furthermore shows by way of example that the pairs are in each case formed not by individual pixels, but rather by pixel groups 38. Otherwise, the embodiment in FIG. 6 corresponds to that in FIG. 4.

Pairs of pixel groups can of course be used in each of the described embodiments, just as the configuration can be realized only for the depth resolution, only for the spectral resolution, or for mixed depth and spectral resolution of each embodiment.

In FIG. 1, the manipulation device is arranged purely by way of example in the pupil plane, since this is advantageous in the case of a phase mask. In manipulation devices of different design, other positions may be expedient. Neither is it necessary for the illumination radiation to pass through the manipulation object 20, as shown in FIG. 2. It is likewise possible to input the illumination radiation in a manner such that the manipulation element 18 does not act on the illumination radiation. Examples of this are swapping the manipulation object 18 and beam splitter 11, or illuminating the sample on a side opposite the objective 4. If a pupil plane is required at a remote location from the objective, for example so that the pupil plane 20 is located between the beam splitter 11 and the detector 8, what is known as pupil imaging may be appropriate, which is known for this purpose to a person skilled in the art. When using opposing phase ramps as manipulation element 18, with each phase ramp being located in a pupil half, it is additionally possible to introduce a further phase function that results in an extension of the depth of field. In this way, the z-resolution and the capturable z-region, which is accessible with the measurement, can be balanced with respect to one another. Such additional phase functions can be achieved by way of cubic phase masks or ring masks. They can be provided in addition to the manipulation element 18 or can be integrated therein. The latter is possible in particular with a spatial light modulator.

For the calculation method, it is advantageous if the point spread function has a low self-similarity. This is understood to mean that the distance between the centers of the image lobes 24.x.1 and 24.x.r is greater than the extent of the image lobes, preferably at least twice as great. If the self-similarity of the point spread function is potentially too great, it is possible to ascertain artefacts using post-processing. To this end, the point spread function must be known, which can be measured in the conventional way.

For the sake of comprehension, the present text sometimes refers to cross-correlation. The use of a cumulant function is an alternative.

The algorithm for image acquisition can, in the example of depth information, take the following form in particular, wherein k, l, m, o designate loops:

For each frame of the image sequence:
k. the frame is oversampled for final resolution to produce the synthetic pixels
  l. for each of the depth planes
    m. for each synthetic pixel
      o. for each pixel pair, the products of the pixel values for the calculation of the cross-correlations are formed
      End o.
    End m.
  End l.
End k.

This algorithm initially considers the depth plane and then works through the synthetic pixels for each depth plane. In other words, first the synthetic pixels for a first value of the parameter are processed, that is to say for their subpixels, then for a second value, that is to say their second subpixels, etc. This can of course be inverted, that is to say the location of the loops 1 and m can be swapped. Next, for each synthetic pixel in succession, the subpixels thereof are worked through. The selection among these two alternatives can be made according to which is easier to perform in the real implementation. The results are the same.

What is claimed is:

1. A fluctuation-based fluorescence microscopy method for producing a high-resolution image of a sample, wherein the method comprises the following steps:
  a) providing the sample with a substance which, after excitation, emits fluorescence radiation in a blinking manner, or using a sample containing such a substance,
  b) irradiating the sample with illumination radiation and consequently exciting the sample (2) to emit the fluorescence radiation,
  c) imaging the sample emitting the fluorescence radiation from a focal plane onto a spatially resolving detector, which comprises pixels, and producing an image sequence of frames that differ in terms of a blinking state of the sample, and
  d) evaluating the image sequence and producing a high-resolution sample image,
wherein:
  in step c), the imaging of the sample emitting the fluorescence radiation is optically influenced in dependence on a parameter, wherein the parameter is a position with respect to the focal plane and/or a wavelength of the emitted fluorescence radiation, and the influencing causes point emitters in each frame to be imaged into imaged point emitter representations that in each case have at least two image lobes, the relative position of which depends on the parameter, and
  in step d), subframes are produced for each frame on the basis of the influencing that is dependent on the parameter and are specified with respect to the parameter, and the evaluation of the image sequence of frames is performed on the basis of the subframes.

2. The microscopy method as claimed in claim 1, wherein, in step d), the following sub-steps are performed:
   d1) defining a plurality of discrete values for the parameter, and generating synthetic pixels which are smaller and situated more densely than the pixels of the detector for all frames,
   d2) defining for each synthetic pixel, a plurality of n-tuples of pixel groups or individual pixels among the pixels of the detector, wherein n designates the number of image lobes and the n-tuples are defined based on the influencing, which is dependent on the parameter, in a manner such that each of the n-tuples is assigned an individual one of the discrete values of the parameter, and
   d3) dividing each of the synthetic pixels into a plurality of subpixels, wherein each subpixel is assigned one of the discrete values of the parameter,
   d4) ascertaining for each synthetic pixel, brightnesses of the subpixels in each frame on the basis of signal correlation values of the n-tuples which were defined for the synthetic pixel,
   d5) producing the subframes for each frame based on the synthetic pixels, which have been divided into subpixels.

3. The microscopy method as claimed in claim 2, wherein, in step d4), a subpixel allocation operation is performed to ascertain the brightnesses of the subpixels for each synthetic pixel, in which operation a signal correlation value is ascertained for each of the defined n-tuples and allocated to the subpixel of the synthetic pixel that is assigned to the n-tuple.

4. The microscopy method as claimed in claim 2, wherein, in sub-step d4), a cross-correlation or cumulant function is used to ascertain the signal correlation values.

5. The microscopy method as claimed in claim 1, wherein each pair of pixel groups or of individual pixels is situated symmetrically with respect to a center and the lateral coordinate of the center is the lateral coordinate of the associated synthetic pixel.

6. The microscopy method as claimed in claim 1, wherein the two image lobes each have an image lobe extent and an image lobe center that are spaced apart such that the distance between the image lobe extent and the image lobe center is greater than the image lobe extent.

7. The microscopy method as claimed in claim 6, wherein the distance between the image lobe extent and the image lobe center is at least twice as great as the image lobe extent.

8. The microscopy method as claimed in claim 1, wherein one or more of a phase element, an anisotropic optical unit, a spatial light modulator, an axicon, a cubic phase mask and a ring phase mask is used for the parameter-dependent influencing of the point spread function.

9. A microscope for fluctuation-based fluorescence microscopy of a sample, which, after excitation, emits fluorescence radiation in a blinking manner, the microscope comprising:
   an illumination beam path for exciting the sample to emit the fluorescence radiation,
   an imaging beam path for imaging the sample emitting the fluorescence radiation from a focal plane onto a spatially resolving detector, which comprises pixels, and for producing an image sequence of frames that differ in terms of a blinking state of the sample, and
   an evaluation device comprising a processor, the evaluation device configured for evaluating the image sequence and for producing a high-resolution sample image,
wherein:
   the imaging beam path comprises an optical manipulator which optically influences the imaging of the sample emitting the fluorescence radiation in dependence on a parameter, wherein the parameter is a position with respect to the focal plane and/or a wavelength of the emitted fluorescence radiation, and the influencing causes point emitters in each frame to be imaged into imaged point emitter representations that in each case have at least two image lobes, the relative position of which depends on the parameter, and
   the evaluation device is configured for producing subframes for each frame on the basis of the influencing that is dependent on the parameter and caused by the optical manipulator and for specifying them with respect to the parameter, and for performing the evaluation of the image sequence of frames on the basis of the subframes.

10. The microscope as claimed in claim 9, wherein the evaluation device is configured to perform the steps of:
   d1) defining a plurality of discrete values for the parameter, and generating synthetic pixels which are smaller and situated more densely than the pixels of the detector for all frames,
   d2) defining for each synthetic pixel, a plurality of n-tuples of pixel groups or individual pixels among the pixels of the detector, wherein n designates the number of image lobes and the n-tuples are defined based on the influencing, which is dependent on the parameter, in a manner such that each of the n-tuples is assigned an individual one of the discrete values of the parameter, and
   d3) dividing each of the synthetic pixels into a plurality of subpixels, wherein each subpixel is assigned one of the discrete values of the parameter,
   d4) ascertaining for each synthetic pixel, brightnesses of the subpixels in each frame on the basis of signal correlation values of the n-tuples which were defined for the synthetic pixel,
   d5) producing the subframes for each frame based on the synthetic pixels, which have been divided into subpixels.

11. The microscope as claimed in claim 9, wherein the optical manipulator comprises a phase element, an anisotropic optical unit, a spatial light modulator, an axicon, a cubic phase mask and/or a ring phase mask.

* * * * *